United States Patent
Reinhardt et al.

(10) Patent No.: US 7,705,069 B2
(45) Date of Patent: Apr. 27, 2010

(54) INK JET COMPOSITION

(75) Inventors: Erin M. Reinhardt, Webster, NY (US); Daniel A. Foucher, Toronto (CA)

(73) Assignee: Xerox Corporation, Norwalk, CT (US)

( * ) Notice: Subject to any disclaimer, the term of this patent is extended or adjusted under 35 U.S.C. 154(b) by 208 days.

(21) Appl. No.: 10/994,784

(22) Filed: Nov. 22, 2004
(Under 37 CFR 1.47)

(65) Prior Publication Data
US 2006/0111467 A1 May 25, 2006

(51) Int. Cl.
*B41J 2/01* (2006.01)
*B41J 2/17* (2006.01)
*C08G 69/26* (2006.01)
*C08G 69/44* (2006.01)
*C08G 73/10* (2006.01)
*C08J 3/00* (2006.01)
*C08K 5/06* (2006.01)
*C08K 5/34* (2006.01)
*C08K 3/28* (2006.01)
*C08K 5/3435* (2006.01)
*C08L 77/00* (2006.01)
*C08L 79/00* (2006.01)
*C09D 11/00* (2006.01)
*G01D 11/00* (2006.01)

(52) U.S. Cl. .................. 523/160; 106/31.27; 106/31.28; 106/31.43; 106/31.49; 106/31.57; 106/31.6; 347/1; 347/95; 347/100; 523/161; 524/106; 524/376; 524/429; 524/602; 524/606

(58) Field of Classification Search .................. 523/160, 523/161; 106/31.6, 31.27, 31.28, 31.43, 106/31.49, 31.57; 524/602, 606, 106, 376, 524/429; 347/1, 95, 100
See application file for complete search history.

(56) References Cited

U.S. PATENT DOCUMENTS

| | | | |
|---|---|---|---|
| 4,251,824 A | 2/1981 | Hara et al. | |
| 4,410,889 A | 10/1983 | Bryant et al. | |
| 4,412,224 A | 10/1983 | Sugitani | |
| 4,463,359 A | 7/1984 | Ayata et al. | |
| 4,532,530 A | 7/1985 | Hawkins | |
| 4,601,777 A | 7/1986 | Hawkins et al. | |
| 5,120,361 A | 6/1992 | Winnik et al. | |
| 5,139,574 A | 8/1992 | Winnik et al. | |
| 5,145,518 A | 9/1992 | Winnik et al. | |
| 5,207,824 A | 5/1993 | Moffatt et al. | |
| 5,266,106 A | 11/1993 | Breton | |
| 5,356,464 A | 10/1994 | Hickman et al. | |
| 5,851,274 A * | 12/1998 | Lin ........................ | 106/31.43 |
| 6,252,025 B1 * | 6/2001 | Wang et al. .............. | 526/292.9 |
| 6,518,370 B2 * | 2/2003 | Abuelyaman et al. ....... | 525/437 |
| 6,541,600 B1 * | 4/2003 | Wang et al. .................. | 528/310 |
| 6,612,685 B1 * | 9/2003 | Marra et al. .................. | 347/41 |
| 6,713,530 B2 * | 3/2004 | Wang et al. .................. | 523/160 |
| 7,034,065 B2 * | 4/2006 | Wang et al. .................. | 523/160 |
| 2003/0087990 A1 * | 5/2003 | Chen et al. .................. | 523/161 |
| 2004/0024087 A1 * | 2/2004 | Bruchmann et al. ......... | 523/160 |
| 2004/0072923 A1 * | 4/2004 | Matsunami et al. ......... | 523/160 |

FOREIGN PATENT DOCUMENTS

| | | | |
|---|---|---|---|
| EP | 1295918 A2 * | 9/2002 | |
| EP | 1295919 A2 * | 9/2002 | |
| WO | WO 02/36697 A1 * | 5/2002 | |
| WO | WO 2004/074389 A1 * | 9/2004 | |

* cited by examiner

*Primary Examiner*—Patrick D Niland
(74) *Attorney, Agent, or Firm*—Fay Sharpe LLP

(57) ABSTRACT

An ink jet ink composition comprised an anti-curl agent and ink jet printing processing using such ink jet ink composition. The ink jet ink composition includes a hyperbranched polymer. The hyperbranched polymer acts as an anti-curl agent to control curl during a printing process. The anti-curl agent, i.e., the hyperbranched polymer, may be present in the ink amounts less than conventional anti-curl agents and still effectively control curl without detrimentally effecting intercolor bleed control water fastness or drying. Additionally, the ink composition do not exhibit increases in viscosity, and problems associated therewith, that occur in ink composition using conventional anti-curl agents.

5 Claims, No Drawings

INK JET COMPOSITION

BACKGROUND

The present disclosure relates to ink jet ink compositions and ink jet printing processes. More specifically, the present disclosure relates to ink jet compositions comprising novel anti-curl agents suitable for use in multi-color ink jet printing processes.

Ink jet printing is a non-impact printing method that produces droplets of ink that are deposited on a print substrate such as paper or transparent film in response to an electronic digital data signal. Thermal or bubble jet drop-on-demand ink jet printers have found broad applications as output for personal computers in the office and in the home.

In existing thermal ink jet printing processes, the printhead typically comprises one or more ink jet ejectors. Each ejector includes a channel communicating with an ink supply chamber, or manifold, at one end and an opening at the opposite end, referred to as a nozzle. A thermal energy generator, usually a resistor, is located in each of the channels at a predetermined distance from the nozzles. The resistors are individually addressed with a current pulse to momentarily vaporize the ink within the respective channel to form a bubble that expels an ink droplet. As the bubble grows, the ink rapidly bulges from the nozzle and is momentarily contained by the surface tension of the ink as a meniscus. This is a very temporary phenomenon, and the ink is quickly propelled toward a print substrate. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity for propelling the droplet in a substantially straight line direction towards a print substrate, such as a piece of paper. Important properties of the ink in this context include the ink's viscosity and surface tension. Subsequently, the ink channel refills by capillary action and is ready for the next repeating thermal ink jet process. Thermal ink jet processes are well known and described in, for example, U.S. Pat. Nos. 4,251,824, 4,410,889, 4,412,224, 4,463,359, 4,532,530, 4,601,777, 5,139,574, 5,145,518, and 5,281,261, the entire disclosures of which are incorporated herein by reference. Because the droplet of ink is emitted only when the resistor is actuated, this type of thermal ink jet printing is known as "drop-on-demand" printing.

Another type of drop-on-demand ink jet printing is called piezoelectric ink jet printing. This ink jet printing system has an ink filled channel with a nozzle on one end and a regulated piezoelectric transducer near the other end to produce pressure pulses according to the digital data signal.

A third type of drop-on-demand ink jet printing is called acoustic ink jet printing which can be operated at high frequency and high resolution. The ink jet printing system utilizes a focused acoustic beam formed with a spherical lens illuminated by a plane wave of sound created by a piezoelectric transducer. The focused beam reflected from a surface exerts a pressure on the surface of the liquid ink, resulting in ejection of small droplets of ink onto an imaging substrate. Aqueous ink jet inks can be used in this printing system.

An ink jet printing method that is different from the drop-on-demand ink jet printing is called continuous ink jet printing. In this ink jet printing system, ink is emitted from a nozzle in a continuous stream under pressure. The stream is ejected out of an orifice and perturbed, causing it to break up into droplets at a fixed distance from the orifice. At the break up point, the electrically charged ink droplets are passed through an applied electrode which is controlled and switched on and off according to the digital data signals. The charged ink droplets are passed through a controllable electric field which adjusts the trajectory of each ink droplet in order to direct it to either a gutter for ink deletion and recirculation or a specific location on a print substrate to create an image. Multiple orifices or nozzles can be used to increase imaging speed and throughput.

In an ink jet printing apparatus, the printhead typically comprises a linear array of ejectors, and the printhead moves relative to the surface of the print substrate, either by moving the print substrate relative to a stationary printhead, or vice-versa, or both. In some types of apparatuses, at least a relatively small print head supplied with an ink moves across a print sheet numerous times in swaths in order to complete an image. For multicolor ink jet printing, a set of printheads and ink (e.g. cyan, magenta, yellow and black) can move across the print substrate numerous times in swathes and disperse selected inks in any desired pattern (e.g., ⅛, ¼, ½, fulltone (1/1)) according to digital signals. The speed of this type of single or multiple color ink jet printing on a substrate is determined by the moving speed of the printheads across the print substrate, ink jetting frequency (or frequency response), and the desired number of swathes needed for printing. The printing speed of this type of ink jet apparatus can be increased if two or more print heads are budded together to form a partial-width array printhead for printing each ink in a monochrome or multicolor ink jet printing system. The partial-width ink jet printhead has more ink jet nozzles per printhead, and can deliver a large number of ink droplets across the substrate in a swath in a short period of time. Monochrome or multicolor ink jet printing apparatuses using one or several partial-width printheads may have a faster printing speed than current commercial ink jet printers.

Alternatively, a printhead that consists of an array of ejectors (e.g., several butted printheads to give a full-width array printhead) and extends the full width of the print substrate may pass an ink down once onto the print substrate to give full-page images, in what is known as a "full-width array printer". When the printhead and the print substrate are moved relative to each other, image-wise digital data is used to selectively activate the thermal energy generators in the ink jet printhead over time so that the desired image will be created on the print substrate at a fast speed. For multicolor ink jet printing, several full-width array printheads and inks (e.g., cyan, magenta, yellow, and black) can be used to deliver multiple color inks onto a print sheet. This type of multicolor ink jet printing process is capable of printing multiple color images and monochrome color images on a print substrate at a much faster speed (e.g., more than five pages of full color images per minute) than current commercial color ink jet printers.

In multicolor ink jet printing processes, several inks can be printed on a print substrate. In some instances, two different inks can be printed next to each other. Intercolor bleed can occur if the inks are not dried properly or if the printing process is too fast for the inks to set. Undesired ink mixing on a print substrate, especially on the surface of a plain paper, can cause distorted images near the border of two inks. After the inks dry, the border of the two inks can appear irregular with poor edge sharpness (or raggedness) due to the invasion of one ink into the other. Such bleed images are visibly unattractive. This phenomenon is generally called intercolor bleed (ICB). Intercolor bleed occurs particularly when a darker colored ink (such as a black ink) and a lighter colored ink (such as a yellow ink, a cyan ink, a magenta ink, or the like) are printed next to each other because of the high contrast between the two colors. Intercolor bleed can also occur when two color inks are printed next to each other (for example yellow ink next to magenta ink, yellow ink next to cyan ink, magenta ink next to cyan ink or the like). The severity of the intercolor bleed generally is affected by the ink type and composition, absorption rate of the printer substrate, printhead design, ink drop mass, ink dot size and method and speed of printing. As a result, there is a need to reduce intercolor bleed and to produce high quality multicolor ink jet images on print substrates, including plain and coated papers, transparencies, textiles and other desired substrates.

In the thermal ink jet printing water is usually a key component, which is responsible for the bubble formation and propelling the ink out of nozzles toward the imaging substrate (print sheet). The use of water in large concentrations, however, has also some disadvantages. Water has a fast evaporation rate relative to high boiling organic solvents (e.g. humectants, anti-curl agents, etc.). Ink ingredients such as water soluble or water compatible dyes, pigments, biocides, and other chemical additives may become destabilized due to the loss of water during idling time. As a result printheads may become plugged, which produce some jetting failure.

Water also interacts with paper to cause two major distortions known as paper cockle and paper curl. Paper cockle is a distortion in which bumps, indentations and other irregularities are randomly produced on the printed paper, giving the paper a "wrinkled" appearance.

Curl is a phenomena in which the edges or corners of the paper migrate towards (toward imaging side) or away from (away from the imaging side) the center of the paper. Generally, the term "curl" refers to the distance between the base line of the arc formed by a recording sheet when viewed in cross-section across its width (or shorter dimension—for example, 8.5 inches in an 8.5×11 inch sheet, as opposed to length, or longer dimension—for example, 11 inches in an 8.5×11 inch sheet) and the midpoint of the arc. This type of curl applies to long grain cut paper, since curl is typically perpendicular to the process direction of a paper making machine. To measure curl, a sheet can be held with the thumb and forefinger in the middle of one of the short edges of the sheet (for example, in the middle of one of the 8.5 inch edges in an 8.5×11 inch sheet) and the arc formed by the sheet can be matched against a pre-drawn standard template curve. Such curl measurement is referred to as "hanging radius curl."

Curl is possibly caused by the printed aqueous ink on one side of the paper releasing stress on the surface of the paper which induces a differential paper stress or uneven stress between top and bottom surfaces for the paper after drying and aging. The direction of curl may be toward the printed (imaged) side of the paper, or it may be toward the non-printed (non-imaged) side. Application of liquid inks that contain water to paper causes an initial hydroexpansion of the fibers of the paper. This initial hydroexpansion causes an expansion curl away from the image which occurs typically right after printing. Steady state curl, also known as cool curl, is toward the image, and typically occurs over a period of time when the sheet tries to achieve a state of final stress release after being dried. Active drying accelerates the effect of towards the image curl or steady state curl. For the purpose of this disclosure, paper "curl" is defined as including both curling and cockling of the paper substrate.

Curl may appear immediately after printing or may take a day or two to manifest. In its final state, the paper sheet in a severe case may take the form of a tube, a roll, or a scroll. Curled paper cannot be stacked sheet upon sheet, thereby causing much inconvenience to the user. Curled sheets are difficult to display or store and cannot be used in processes requiring near planarity, such as media feeding, tracking, and print alignment. Curl is most prevalent in solid area printing and is therefore a more acute problem in graphics than in text printing. For the same reason, it is also a concern in four color printing especially when it involves printing composite colors or where graphics are prominent. Curl is also a problem when a large quantity of ink is needed to achieve high optical density images.

The severity of the paper curl may be affected by the property of the plain and coated paper substrates, the type of aqueous ink used in the printing, temperature of the substrate during printing, and the ink jet printing process. Papers that have a small built-in differential stress between the top and bottom surfaces in the paper manufacturing process may provide little curl after ink jet printing. On the other hand papers with a large built-in differential stress between the top and bottom surface will tend to exhibit significant paper curl after ink jet printing. The degree of differential stress that is built into the papers depends on the conditions of the paper manufacturing process. Papers that are thicker or heavier and have a stronger mechanical strength tend to give lower degree of paper curl as compared to those thinner papers with weaker mechanical strength. Once a paper used in the ink jet printing is selected then the fate of curl formation is somewhat fixed. Some papers will develop curl much easier than others. In an ordinary office environment, plain and coated papers are used in the ink jet printing. Depending on the paper supply situation in the office, a customer may not have a chance to select a proper paper with a smaller curl property for the ink jet printing. Thus, there is a need to have a process that reduces paper curl with minimum impact from the paper.

Inks having a large amount of anti-curl agent may reduce the curl. However, the use of the required amount of the anti-curl agents in the inks, which is generally in excess of 10% by weight of the ink composition, may increase the viscosity of the ink and cause great difficulty in jetting the inks, especially after some idling in a printhead. This is especially true when water evaporates near the nozzles during idling time, resulting in a dramatic increase in ink viscosity and possible jetting failure. Water evaporation during idling time can also cause crystallization and precipitation of dyes or agglomeration of pigments. Most of the anti-curl agents have high boiling point and high viscosity. Thus, the use of high viscosity anti-curl agents in required large quantities may cause short ink latency and increase jetting difficulty. This is especially true when a high resolution ink jet printhead is used, which has a narrow nozzle opening (about 10 to 49 microns for a 400 and 600 spots per inch resolution printhead as compared to greater than 49 microns in a 300 spots per inch resolution printhead). Due to these aforementioned limitations there is a need to develop a process for the ink jet printing whereby ink jet printing of solid area images for graphic applications can be easily carried out to give reduced paper curl.

In ink jet printing, it is desirable to reduce the consumption of paper for economic and environmental reasons. Duplex printing sometimes may be desired. However, if a paper has been printed with aqueous ink jet images having solid areas the paper may form curl or cockle, which prohibits smooth paper feeding in subsequent ink jet printing. Thus, printing duplex (on two sides of a paper) can be difficult if the imaged paper is not treated quickly after printing. Paper curl progressively becomes worse upon aging after printing. There is a need to provide a means for both single sided ink jet printing and two sided (duplex) ink jet printing to provide images on papers with reduced curl.

Ink jet printing (checkboarding or single pass) may also affect paper curl in multiple color printing especially printing that involves a solid area image. There is also a need to provide a decurling process to reduce paper curl.

Depending on the type of color images printed, paper curl caused by aqueous ink jet inks may vary. For example, printing blue, green and red images on a paper requires the use of several inks (e.g., 200% of normal ink coverage) which is significantly more than when printing single color cyan, magenta and yellow images (e.g. 100% of normal ink coverage). As a consequence, the printing of solid area images of blue, green and red (composite colors) create a greater paper curl problem than those of single color images (e.g., cyan, magenta and yellow). Increased curling also can be found when solid areas of images are printed in a single pass mode rather than multiple passes (e.g., checkerboarding) mode.

The permanence issue in thermal ink jet prints is usually related to the waterfastness, lightfastness and to a lesser extent the cool curl of plain papers which shortfall relative to traditional Xerography. Direct marking in thermal ink jet printing, however, does not benefit from fusing temperatures that essentially "iron out" curl issues in Xerography and must provide curl control through ink formulation. Cool curl control on plain papers remains a high priority for the Aruba and Caribbean refresh products and is an issue for Martinique products. Currently, cool curl is essentially not controlled, but merely delayed in formulations that contain up to 10% acetyl ethanolaine (AEA) or trimethylolpropane (TMP). This problem is readily observed in large solid areas of printed colors and causes plain papers to undergo dramatic scrolling.

In an effort to reduce cockle and curl in ink jet printers, efforts have been made to provide anti-curl and anti-cockling agents to reduce this problem. For example, U.S. Pat. No. 5,356,464 to Hickman et al. describes anti-curl agents at a desired amount that may be utilized in ink jet inks. However, such anti-curl agents negatively affect the stability of inks by increasing the viscosity. Such inks decrease latency and increase clogging of ink jet printhead nozzles.

U.S. Pat. No. 5,207,824 to Moffatt et al. describes an ink jet ink comprising an anti-cockling agent for thermal ink jet printers. In some cases, the use of a required amount of anticockling agents in the inks to reduce curl tends to aggravate the nozzle pluggage and jetting failure. This is possibly due to their contribution of the viscosity increase of inks and incompatibility of ink ingredients with some dyes or pigments. The effective use of anticockling agents in ink sometimes may be limited.

Dendrimers, which have highly branched architectures, have been used as low viscosity additives to improve binding and smear resistance in ink jet inks. The use of dendrimers in ink compositions is disclosed in, for example, U.S. Pat. Nos. 5,120,361 and 5,266,106, the entire disclosures of which are incorporated herein by reference. DSM has developed a poly (propylene imine) dendrimer, currently available under the name ASTRAMOL™. However, dendrimers are typically prepared in low volumes by the stepwise, controlled synthesis of very regular structures. The stepwise synthesis of dendrimers generally involves protect-deprotect strategies and purification procedures at the conclusion of each step. Consequently, synthesizing dendrimers can be a tedious, difficult and expensive process.

There is thus a need in the art for new methods of reducing curl in printed paper for ink jet printers. There is also a need for ink jet printers that utilize aqueous inks and clear aqueous liquids that can reduce paper curl.

A need also exists in the art for a printing process that allows printing in full page graphics/text without producing paper curl with inks having high pigment concentrations. There is a further need for a process, an apparatus and ink jet inks that provide enhanced print quality in high resolution printers without causing undesired curl of the printed materials.

BRIEF DESCRIPTION

The present disclosure is directed to one or more of the foregoing objects and provides in one aspect an ink jet ink composition comprising a novel anti-curl agent.

In another aspect of the present disclosure, an ink jet ink composition is provided that comprises water, a colorant selected from the group consisting of a dye, a pigment, and mixtures thereof, and a hyperbranched polymer.

In yet another aspect of the present disclosure, an ink jet ink composition suitable for high resolution ink jet printing is provided, that comprises water, a colorant selected from the group consisting of a dye, a pigment, or mixtures thereof, and an anti-curl agent comprising a hyperbranched polymer.

In still another aspect of the present disclosure, an ink jet printing process is provided that includes applying an ink jet ink composition onto a substrate with an ink jet printhead. The ink jet ink composition in the process includes an anti-curl agent that comprises a hyperbranched polymer.

In still another aspect of the present disclosure, a method for controlling curl in an ink jet printing process is provided. The method for controlling curl and ink jet printing process includes applying at least one ink jet ink composition in an image wise fashion to a substrate. The ink jet ink composition in the method comprises a hyperbranched polymer that acts as an anti-curl agent.

DETAILED DESCRIPTION

According to the present disclosure, an ink jet ink composition is provided which comprises an anti-curl agent that controls or reduces paper curl that typically occurs when printing a multi-color image onto a print substrate (e.g., plain paper).

In the ink jet ink compositions of the disclosure, the anti-curl agent is a hyperbranched polymer. Hyperbranched polymers are branched polymers that exhibit a degree of branching intermediate between that of linear polymers and dendrimers. Hyperbranched polymers are prepared in a one step, one pot procedure. Thus, hyperbranched polymers may be prepared or synthesized in large quantities, at high yields, and at relatively low costs.

Any hyperbranched polymer capable of controlling paper curl during an ink jet printing process may be used as the anti-curl agent of the ink jet ink compositions of the disclosure. Preferably, the hyperbranched polymer is water soluble. The solubility, as well as other properties of the hyperbranched polymer, can be controlled and adjusted by varying the molecular weight, by modifying the end group of the polymer, and by the choice of the building block compounds for the core compounds of the hyperbranched polymers. Preferably, the hyperbranched polymers include one or more water solubilizing end groups. Suitable end groups include but are not limited to carboxylic acids, hydroxyl, acetates and the like. The hyperbranched polymers are not limited with respect to properties such as molecular weight, or polydispersity, except to the extent that such properties affect the solubility of the hyperbranched polymer in the ink composition, or affect the hyperbranched polymers ability to act as an anti-curl agent.

An example of a suitable hyperbranched polymer for use as an anti-curl agent in the present ink jet ink compositions includes, but is not limited to, HYBRANE™ hyperbranched polymers available from DSM. Suitable HYBRANE polymers include, for example, a hyperbranched polyesteramide that includes solubilizing carboxylate groups.

It has been found that when hyperbranched polymers are used as anti-curl agents in ink jet ink compositions, such polymer anti-curl agents may be present in concentrations significantly lower than conventional anti-curl agents. As previously discussed, anti-curl agents are typically present in ink jet ink compositions at concentrations in excess of 10% by weight of the ink composition. However, when anti-curl agents are used at such high concentrations, the viscosity of the ink composition increases which may adversely affect the printing process. The hyperbranched polymer anti-curl agents of the present disclosure may be present in the ink compositions in an amount of less than 10% by weight. The hyperbranched polymer anti-curl agents are preferably present in the ink compositions in an amount of about 0.5 weight percent to about 6.0 weight percent. In preferred embodiments the hyperbranched polymer is present in an amount of from about 1.0% by weight to about 2.0% by weight of the ink composition. Thus, ink compositions using hyperbranched polymers may not suffer from problems such as short ink latency or increased jetting difficulty as is found in inks using conventional anti-curl agents.

Thus in embodiments, the present disclosure provides an ink jet ink composition comprising water, a colorant, and a hyperbranched polymer. The hyperbranched polymer acts as an anti-curl agent and controls or reduces the curl of the printing substrate, e.g., a piece of paper, during the printing process.

Also identified herein is the use of hyperbranched polymer materials as curl control additives in color thermal ink jet inks. Unlike classic linear polymers and gelatins that can add additional stress when coated or dried on papers, hyperbranched polymers fix to paper without excessive penetration. These materials exhibit intercolor bleed control, waterfastness enhancement and dry time.

The ink jet inks of the present disclosure also comprise at least a colorant. The colorant for the ink jet ink compositions can be selected from a dye, a pigment, and a mixture of dye and pigment. The colorant can be selected from any of the suitable colorants listed in the Color Index, which is published jointly by American Association of Textile Chemist and Colorists (AATCC) and The Society of Dyers and Colorists in Bradford, England; BUYER'S GUIDE for Textile Chemist and Colorist published by AATCC, and those known in the art. The colorant may be present in the inks either with or without a dispersing agent. For example, pigment particles such as those modified chemically to possess ionizable functional groups in water such as carboxylate and sulfonate groups are stable in an aqueous ink and they do not require a dispersing agent in the ink. Some examples of those chemically modified pigments (e.g., carbon blacks) are described in U.S. Pat. No. 5,281,261 to Lin, the entire disclosure of which is incorporated herein by reference. Pigment particles which are not chemically modified require the use of at least a dispersing agent to stabilize them in the ink. The pigment dispersing agent can be selected from a group consisting of anionic, cationic, and nonionic types.

In embodiments of the present disclosure where dyes are used, the dye is present in the ink jet ink composition in any effective amount to provide desired color and optical density (OD). Typically the dye is present in an amount from about 0.1 to about 15% by weight of total ink weight, and preferably from about 1.0 to about 10% by weight of total ink weight, although the amount can be outside this range. A mixture of dyes in any desired proportion may also be employed to obtain a specific shade or hue. Similarly, in embodiments of the present disclosure where pigments are used, the pigment may be present in the ink jet ink composition in any effective amount. Typically the pigment is present in an amount of from about 0.1 to about 15% by weight of total ink weight and preferably from about 1 to about 10% by weight of total ink weight, although the amount can be outside of this range. Where both dyes and pigments are incorporated into the ink jet ink composition, the weight percentage of the combined colorant may be adjusted accordingly.

The ink jet ink composition may contain a dye colorant. Any suitable dye or mixture of dyes compatible with the ink liquid vehicle can be used, with water soluble anionic dyes, direct dyes, reactive dyes, and cationic dyes being preferred. Examples of suitable dyes include, but are not limited to, Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza annulenes, Formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof.

Pigment may also be used in the ink jet ink composition of the present disclosure. The pigment can be of any desired color, such as black, cyan, magenta, yellow, red, blue, green, brown, or the like, as well as mixtures thereof. It is preferable that the color of the pigment particles is either similar to or the same as the color of another colorant in a mixture so there is no interference or impairment of the desired color of the final ink. Examples of suitable pigments in the ink jet ink compositions include various carbon blacks such as channel blacks, furnace blacks, lamp blacks, Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen® Violet 5890 (BASF), Permanent Violet VT2645 (Paul Uhlich), Heliogen Green L8730 (BASF), Argyle Green XP-111 -S (Paul Uhlich), Brilliant Green Toner GR 0991 (Paul Uhlich), Heliogen® Blue L6900, L7020 (BASF), Heliogen® Blue D6840, D7080 (BASF), Sudan Blue OS (BASF), PV Fast Blue B2G01 (American Hoechst), Irgalite Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho Orange OR 2673 (Paul Uhlich), Paliogen® Yellow 152, 1560 (BASF), Lithol Fast Yellow 0991K (BASF), Paliotol Yellow 1840 (BASF), Novoperm® Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm® Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen® Red 3871 K (BASF), Paliogen® Red 3340 (BASF), and Lithol Fast Scarlet L4300 (BASF).

The preferred pigments for the ink jet inks of the present disclosure are nontoxic and nonmutagenic materials. They show a negative response in an AMES test for mutagenic material. Nonmutagenic and noncarcinogenic carbon blacks and color pigments are desired in ink jet inks for safety reasons. For example, it is desired to have pigments, including carbon blacks and color pigments that have a very low concentration of polyaromatic hydrocarbons, which are known to be carcinogenic or mutagenic. For illustrative purposes, nitropyrene, pyrene, tetracene, pentacene, and many other polyaromatic hydrocarbons in many commercial carbon blacks and color pigments are considered to be toxic at a concentration greater than 5 parts per million. Thus, it is desirable to limit the amount of such toxic polyaromatic hydrocarbons in the pigments to less than 5 parts per million for the preparation of nontoxic ink jet inks. Many commercial carbon blacks and colored pigments have a concentration of polyaromatic hydrocarbons exceeding 5 parts per million and, therefore, the inks derived from such pigments are generally considered to be toxic or failing to pass the AMES test (possible mutagenic). However, many nontoxic carbon blacks and color pigments including Raven® 5250, Raven® 5750, Regal® 330, Black Pearl® 1300, Black Pearls® L, Vulcan® XC-7, Hostaperm® pink E, Hostaperm(® blue (a phthalocyanine derivative) and other pigments are generally used in toners and other imaging applications. Those carbon blacks and color pigments usually have a polyaromatic hydrocarbon content of less than 1 part per million, which is below the limit of 5 parts per million that is considered toxic. They do not show positive response in the AMES test and are considered to be safe in toner and ink jet ink applications.

Preferably, the pigment particle size is as small as possible to enable a stable colloidal suspension of the particles in the liquid vehicle with good color strength and to prevent clogging of the ink channels or nozzle openings when the ink is used in an ink jet printer. Preferred average particle sizes or diameters are generally varying from about 0.001 to about 3 microns, although the particle sizes can be outside these ranges in embodiments. A more preferred pigment particle size in the inks of the present disclosure includes particles having at least 50% of the particles being below 0.3 micron with no particles being greater than 3.0 micron (measured on a Hodaka CAPA 700 Particle Size Analyzer). More preferably, the average pigment particle size includes particles having at least 70% of the particles being below 0.3 micron with no particles being greater than 1.2 micron. However, pigment particle sizes can be outside of these ranges provided that they do not cause undesired precipitation and clogging.

In embodiments of the present disclosure, the pigment may be dispersed in the ink with one or more dispersants. The dispersants can be anionic, cationic, and nonionic types. Some preferred dispersants have both hydrophilic (comprising ionic groups which are capable of ionizing in water) and hydrophobic (affinity for pigments) moieties. Suitable dispersants include, but are not limited to, anionic dispersants, such as polymers and copolymers of styrene sulfonate salts (such as $Na^+$, $Li^+$, $K^+$, $Cs^+$, $Rb^+$, substituted and unsubstituted ammonium cations, and the like), unsubstituted and substituted (e.g., alkyl, alkoxy, substituted naphthalene derivatives, and the like) naphthalene sulfonate salts (such as $Na^+$, $Li^+$, $K^+$, $Cs^+$, $Rb^+$, substituted and unsubstituted ammonium cations, and the like) and an aldehyde derivative (such as unsubstituted alkyl aldehyde derivatives including formaldehyde, acetaldehyde, propylaldehyde, and the like), and the like, as well as mixtures thereof. Examples of such pigment dispersants include, but are not limited to, commercial products such as Versa® 4, Versa® 7, Versa® 77 (National Starch and Chemical Co.); Lomar® D (Diamond Shamrock Chemicals Co.); Daxad® 19, Daxad® K (W.R. Grace Co.); Tamol® SN (Rohm & Haas); and the like. Other useful pigment dispersants (anionic) include polymer or copolymers of styrene and an acrylic acid salt, styrene and a methacrylic acid salt, styrene and a maleic acid salt, and the like, as well as mixtures thereof.

Also, nonionic dispersants or surfactants can be used in ink jet inks of the present disclosure, such as ethoxylated monoalkyl or dialkyl phenols including Igepal® CA and CO series materials (Rhone-Poulenc Co., e.g., Igepal® CA-630, CO-630, etc.); and Triton® series materials (Union Carbide Company). These nonionic surfactants or dispersants can be used alone or in combination with the aforementioned anionic or cationic dispersants.

The ratio of pigment to aforementioned pigment dispersant(s) according to the present disclosure ranges from about 1/0.01 to about 1/3, preferably from about 1/0.1 to about 1/1, and most preferably from about 1/0.10 to about 1/0.75. The ratio of naphthalene substituent to aldehyde (e.g., formaldehyde, acetaldehyde, etc.) in the aforementioned anionic dispersant is approximately about 1:1, although this ratio can be different depending on the stoichiometry of the feed stock and reaction condition, and can readily be adjusted to obtain a dispersant having a desired molecular weight and the desired ratio of naphthalene substituent to aldehyde. The remainder of the dispersant may comprise nonactive ingredients such as water, solvent or humectant. The weight-average molecular weight of the dispersant is generally less than 20,000, preferably less than 13,000, and more preferably less than 10,000. The pigment dispersion should contain enough dispersant to stabilize the pigment particles in water, but not so much as to adversely affect properties of the pigment dispersion and ink such as viscosity, stability, and optical density. Stable pigment dispersions comprising the desired dispersing agent or dispersant can be used in ink jet inks of the present disclosure.

The inks may further comprise humectants and/or co-solvents. When present, humectants and/or co-solvents may include any of the various known humectants and co-solvents of ink jet inks including, but not limited to, glycol derivatives, such as ethylene glycol, diethylene glycol, propylene glycol, dipropylene glycol, polyethylene glycol, polypropylene glycol, poly(ethylene-co-propylene) glycol and the like, as well as their reaction products with alkyleneoxides including ethyleneoxide and propyleneoxide; triols containing 3 to 20 carbon atoms such as glycerine, trimethylolpropane, 1,3,5-pentanetriol, 1,2,6-hexanetriol and the like, as well as their reaction products with alkyleneoxides including ethyleneoxide, propyleneoxide, and mixtures thereof; diols containing 2 to 35 carbon atoms such as 1,5-pentanediol, 1,4-petanediol, 1,6-hexanediol, 1,5-hexanediol, 2,6-hexanediol, neopentylglycol(2,2-dimethyl-1,3-propanediol), and the like, as well as their reaction products with alkyleneoxides including ethyleneoxide and propyleneoxide in any desirable molar ratio to form materials with a wide range of molecular weight; sulfoxide derivatives containing 2 to 25 carbon atoms including dialkylsulfoxides (symmetric and asymmetric sulfoxides) such as dimethylsulfoxide, methylethylsulfoxide, alkylphenyl sulfoxides, and the like; sulfone derivatives (symmetric and asymmetric sulfones) containing 2 to 25 carbon atoms, such as dimethysulfone, methylethylsulfone, sulfolane (tetramethylenesulfone, a cyclic sulfone), dialkyl sulfones, alkyl phenyl sulfones, and the like; amides with 2 to 25 carbon atoms, such as N-alkylamides, N,N-dialkyl amides, N,N-alkyl phenyl amides, N-methylpyrrolidinone (a cyclic amide), N-cyclohexylpyrrolidinone, N,N-dimethyl-p-toluamide (aromatic), N,N-dimethyl-o-toluamide, N,N-diethyl-m-toluamide, and the like; ethers, such as alkyl ether derivatives of alcohol, ether derivatives of triols and diols including butylcarbitol, hexylcarbitol, triolethers, alkyl ethers of polyethyleneglycols, alkyl ethers of polypropyleneglycols, and the like; urea and urea derivatives; inner salts such as betaine; thio (sulfur) derivatives of the aforementioned materials (humectants) including thioethyleneglycol, thiodiethyleneglycol, trithio- or dithio-diethyleneglycol, and the like; reaction products of aforementioned materials (humectants) with alkyleneoxides; and mixtures thereof.

One of the preferred humectants or co-solvents used jointly in the embodiments of the present disclosure is a sulfone derivative without a hydroxyl group (nonhydroxyl sulfone derivative) including dimethylsulfone, methylethylsulfone, diethylsulfone, ethylpropylsulfone, dipropylsulfone, propylbutylsulfone, dibutylsulfone, methylphenylsulfone, sulfolane(tetramethylene sulfone), methylsulfolane, dimethylsulfolane, and the like.

The ink jet ink can also comprise a penetrant to avoid inter-color bleeding. The penetrant gives the ink, especially a color ink, a low surface tension, preferably less than 55 dyne/cm and ranging from about 20 to about 55 dynes/cm, and more preferably from about 30 to about 45 dyne/cm. The viscosity of the ink composition is usually less than 10.0 cP (centipoises), preferably from about 1.0 to about 6.0 cP, and more preferably from about 1.0 to about 5.0 cP. Penetrants include, but are not limited to, hydroxyethers (cellusolve® and alkylcellusolves®, carbitol® and alkylcarbitols® such as butylcarbitol®, pentylcarbitol®, hexylcarbitol®, and the like); alkylethers of a glycol derivatives including alkylethers of ethyleneglycol, diethyleneglycol, triethyleneglycol, tetraethyleneglycol, dipropyleneglycol, tripropyleneglycol, and tetra-propyleneglycol; polyethyleneglycol ether derivatives (e.g., methyl, ethyl, propyl, butyl, pentyl, hexyl, phenyl, and alkylphenyl ether derivatives of polyethyleneglycols); and polypropyleneglycol ether derivatives (e.g., methyl, ethyl, propyl, butyl, pentyl, hexyl, phenyl, and alkylphenyl, ether derivatives of polypropyleneglycols), N-methylpyrrolidinone, N,N-dimethyl-p-toluamide, N,N-dimethyl-o-toluamide, N,N-diethyl-m-toluamide, and the like, as well as mixtures thereof.

The ink jet inks of the present disclosure, particularly dye based inks, may optionally include a water soluble or miscible microwave coupler. The microwave coupler can be selected from any of the known microwave couplers, and can be an organic or inorganic salt or a nonionic microwave coupling agent that allows an ink to be dried quickly by a microwave heating device. The ionic type microwave coupler can be selected from an organic or inorganic salt that allows an ink to be dried quickly by a microwave heating device. The microwave coupler can be, for example, a salt that provides the ink jet ink with a desirable conductivity and coupling efficiency. The salts or ionic compounds exhibit a high degree of ionization in aqueous inks with good electrical conductivity and are capable of coupling with a heating device such as a microwave device for drying ink and avoiding intercolor bleeding when the inks are printed next to, for example, a pigment based ink which is stabilized by an anionic dispersant. Those ionic compounds typically include metal and ammonium salts of inorganic and organic acids with cations and anions. Typical cations of salts include, but are not limited to, $H^+$, $NH_4^+$, $Cs^+$, $K^+$, $Na^+$, $Li^+$, $Ca^{2+}$, $Mg^{2+}$, $Zn^{2+}$, $Ni^{2+}$, $Mn^{2+}$, $Co^{2+}$, $Sr^{2+}$, $Cd^{2+}$, $Ba^{2+}$, $Fe^{2+}$, $Cu^{2+}$, $Ga^{3+}$, $In^{3+}$, $Cr^{3+}$, $Pr^{3+}$, $Nd^{3+}$, $Y^{3+}$, $Al^{3+}$, $Fe^{3+}$, lanthanide cations, actinide cations, and the like. The anions of the salts include, but are not limited to, halides ($I^-$, $Br^-$, $Cl^-$, and $F^-$), chlorate ($ClO_3$), $OH^-$, $NO_3^-$, $SO_4^{2-}$, $CH_3CO_2^-$, $CH_3CH_2CO_2^-$, $C_6H_5CO_2$, $C_6H_5SO_3^-$, various ethylene-diaminetetraacetic acid (EDTA) anions, and the like. Metals salts of monovalent and multivalent salts can also be used in ink jet inks of the present disclosure for the reduction of intercolor bleeding (bleed near the border of two different inks) either through microwave heating of the images or chemical interaction with anionic type colorants (e.g., anionic dyes, pigments stabilized with anionic dispersants, pigments with anionic functional group(s) on the surface, and the like) in the presence or absence of heat in a multi-color ink jet printing process (e.g., involving the printing of black, cyan, magenta, and yellow inks or more inks).

The use of those ammonium and mono- and multi-valent metal salts are desirable to be compatible with the ink components of the present disclosure comprising water, the aforementioned diol derivatives of the present disclosure, colorants including dyes and pigments, and other optionally selected ink or chemical additives. They are chosen so that they will not cause a latency or a jetting problem especially for a high resolution printhead with a small orifice size. In embodiments of the present disclosure, the metal and ammonium salts of inorganic and organic acids with cations and anions (salts of monovalent and multi-valent) can be included in the ink jet inks in an amount of from about 0 to about 15% by weight of total ink weight, and preferably in an amount of from about 0 to about 8% by weight of total ink weight, although they can be outside this range.

The ink jet inks of the present disclosure may optionally include a jetting aid such as polyethyleneoxide (<5% by weight) or a small quantity (<0.1% by weight) of stabilized pigment particles. A preferred polyethyleneoxide is one having a weight-average molecular weight of about 18,500. However, the molecular weight of the useful jetting aid can be different. The jetting aid provides smooth jetting or jetting with low jitter and it is particularly useful in dye-based ink jet inks.

Other desired chemical additives including surfactants, water soluble polymers, pH buffers, biocides, chelating agents (EDTA and the like), and other optional additives can also be optionally used in inks of the present disclosure. Such additives can generally be added to ink jet inks of the present disclosure in known amounts for their known purpose.

Chemical additives such as surfactants or wetting agents can be added to the ink. These additives may be of the anionic or nonionic types. Suitable surfactants and wetting agents include, but are not limited to, Tamol SN®, Tamol LG®, and those of the Triton® series (Rohm and Haas Co.); those of the Marasperse® series and those of the Igepal® series (Rhone-Poulenc Co., formerly from GAF Co.); those of the Tergitol® series and those of the Duponol® series (E.I. Du Pont de Nemours & Co.); Surfynol Series (Air Products Inc.), Iconol® Series (BASF Co.), Briji® Series(ICI Americas Inc.), Pluronic® Series (BASF Co.), Emulphor® ON 870 and ON 877 (GAF); and other commercially available surfactants. These surfactants and wetting agents may be present in the pigment dispersion in effective amounts, generally from 0 to about 15 percent by weight of total ink weight, and preferably from about 0.001 to about 10 percent by weight of total ink weight, and more preferably from about 0.01 to about 8 percent by weight of total ink weight, although the amount can be outside these ranges.

Polymeric chemical additives can also be added to the ink jet inks of the present disclosure to enhance the viscosity of the ink. Suitable polymeric additives include, but are not limited to, water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides, polyethyleneimines derivatized with ethylene oxide and propylene oxide, such as the Discole® series (DKS International); the Jeffamine® series (Texaco); and the like. Polymeric additives may be present in the ink jet inks of the present disclosure in amounts of from 0 to about 10 percent by weight of total ink weight, preferably from about 0.001 to about 8 percent by weight of total ink weight, and more preferably from about 0.01 to about 5 percent by weight of total ink weight, although the amount can be outside these ranges.

Other optional additives for the ink jet inks of the present disclosure include biocides such as Dowicil 150, 200, and 75, benzoate salts, sorbate salts, Proxcel® (available from ICI), and the like. When used, such biocides are generally present in an amount of from 0 to about 10 percent by weight, preferably from about 0.001 to about 8 percent by weight, and more preferably from about 0.01 to about 4.0 percent by weight, although the amount can be outside these ranges. Ink jet inks of the present disclosure may also include pH controlling agents. Suitable pH controlling agents or buffering agents include, but are not limited to, acids, bases, phosphate salts, carboxylate salts, sulfite salts, amine salts, and the like. When used, such pH controlling agents are generally present in an amount of from 0 to about 10 percent by weight of total ink weight, preferably from about 0.001 to about 5 percent by weight of total ink weight, and more preferably from about 0.01 to about 5 percent by weight of total ink weight, although the amount can be outside these ranges.

The hyperbranched polymers of the present disclosure can also be used in conjunction with other chemical additives including some known viscous anti-cockle and anti-curl agents in ink jet inks to improve the inks' physical properties (e.g., jetting performance, etc.). Inks comprising known relatively viscous anti-cockle and anti-curl agents at a desired concentration may have undesired high viscosity which can cause poor ink jetting performance (particularly in a high resolution printhead) such as low drop velocity, short latency, low frequency response, low printing speed, jitter, and misdirectionality. However, the replacement of those known viscous anti-cockle and anti-curl agents or humectants in the inks with the less viscous anti-curl agents of the present disclosure can reduce the risk of poor latency and jetting performance of ink jet inks while maintaining good anti-curl and anti-cockle properties. The hyperbranched polymer anti-curl agents of the present disclosure are advantageous due to their low viscosity. The hyperbranched polymers of the present disclosure can be used to replace other known humectants or anti-curl agents in ink jet ink formulations. Low ink viscosity of the materials used in the present disclosure allows fast ink refill in a channel of an ink jet printhead and provides smooth jetting at a high printing speed without causing an air ingestion problem and poor jetting performance.

The ink jet inks of the present disclosure may be applied to a suitable substrate in an image-wise fashion according to digital data signals. Application of the ink onto the substrate can also be made by any suitable printing process compatible with aqueous-based inks, including flexographic printing, pen plotters, continuous stream ink jet printing, drop-on-demand ink jet printing (including piezoelectric, acoustic and thermal ink jet printing processes), and the like.

The print substrate employed can be any substrate compatible with aqueous-based inks. The print substrates include, but are not limited to, textiles, plain papers, such as Xerox® series 10 paper, Xerox® 4024 paper, commercial bond papers and the like; coated papers (or special ink jet papers including photo-realistic ink jet papers), such as those available from Hewlett-Packard, Canon, Eastman Kodak Co., Oji Paper Co., and Xerox Corporation; ink jet transparencies suitable for aqueous inks or ink jet printing processes, including those from Artright Co., Hewlett-Packard Co., Canon Co., Asahi Co., and Xerox Corporation, as well as materials from other commercial sources.

In the ink jet ink printing process, the ink jet inks of the present disclosure may be printed on a print substrate in a single or multiple pass mode by a single printhead, or a partial-width printhead, or a full-width array printhead in an imagewise manner according to the digital data signals. In this ink jet printing process the print substrate and imaged inks can be optionally dried either with or without heat at any stage of the printing process including before, during, and after the printing as well as their combinations thereof. The heat can be applied by a microwave dryer or device. In addition to microwave heating, the inks of the present disclosure on the print substrate can also be dried at any stage of the ink jet printing process including before, during, after, and combinations thereof by a means or method including a radiant heater, a hot plate, a hot roller or drum, a heating element, a lamp, and the like. The drying of the print substrate and inks improves print quality and increases printing speed.

If a multi-color image on a print substrate is needed, a multi-color ink jet printing process is employed. The multi-color thermal ink jet printing process may comprise: (a) a set of at least four different ink jet inks (e.g. consisting of black (K), cyan (C), magenta (M), and yellow (Y) inks) and at least one of the four different ink jet inks comprises water, a colorant selected from a dye, a pigment and mixture thereof, and at least a hyperbranched polymer than can act as an anti-curl agent, (b) applying the set of at least four ink jet inks (K, C, M, and Y) in an imagewise manner onto a print substrate using a single or multiple pass (checkerboard) method in any desired printing sequence according to the digital data signals by their corresponding printheads (K, C, M, and Y) which can be independently selected from a single printhead, a partial-width printhead, and a full-width array printhead, and (c) optionally applying heat to the print substrate and imaged inks at any stage of ink jet printing process including before, during, and after printing as well as combinations thereof.

The multi-color ink jet printing process produces excellent color images on the print substrate including plain papers, coated papers (e.g., silica coated papers, etc.), ink jet papers including photo-realistic ink jet papers, textiles, and ink jet transparencies at a fast speed with sharp edges and very low intercolor bleeding. Furthermore, the color images on the print substrate also have reduced cockle and paper curl.

The following examples describe exemplary embodiments of the present disclosure. These examples are merely illustrative, and in no way limit the present disclosure to the specific materials, conditions or process parameters set forth therein. All parts and percentages are by weight unless otherwise indicated.

EXAMPLES

As shown in Table 1, a total of six salted Monet Yellow inks were formulated with different Hyperbrane polymer solutions. In the past, Monet inks have demonstrated very poor curl control and thus it was chosen to represent an extreme case. Current Martinique ink formulations have less impact on overall curl. The Monet/Hyperbrane inks were printed on 3 different papers (CA-17, CA-2, CA-6) that are known for extensive curl when printed with inkjet inks.

TABLE 1

| Ink Batch # | Batch Description | Purpose | Visc | S.T. | pH | Cond |
|---|---|---|---|---|---|---|
| 1 | 15% Yellow Y-104 Dye (20%), 11% Butyl Carbitol, 7% Sulfolane (5% water), 6% Hybrane SL 1410, 2% Calcium Nitrate Tetrahydrate, 1% Imidazole, 0.65% EDTA, 0.1% Dowicil, 0.05% PEO 18.5K, 57.2% DI H2O | Monet Y with Hybrane WL-1410 | 2.98 | 31.90 | 6.93 | 11.52 |
| 2 | 15% Yellow Y-104 Dye (20%), 11% Butyl Carbitol, 7% Sulfolane (5% water), 6% Hybrane SC 120050, 2% Calcium Nitrate Tetrahydrate, 1% Imidazole, 0.65% EDTA, 0.1% Dowicil, 0.05% PEO 18.5K, 57.2% DiH2O | Monet Y with Hybrane SC 120050 | 2.35 | 34.90 | 5.05 | 13.65 |
| 3 | 15% Yellow Y-104 Dye (20%), 11% Butyl Carbitol, 7% Sulfolane (5% water), 6% Hybrane S 1200, 2% Calcium Nitrate Tetrahydrate, 1% Imidazole, 0.65% EDTA, 0.1% Dowicil, 0.05% PEO 18.5K, 57.2% DI H2O | Monet Y with Hybrane S1200 | 3.13 | 35.00 | 6.88 | 10.87 |
| 4 | 15% Yellow Y-104 Dye (20%), 11% Butyl Carbitol, 7% Sulfolane (5% water), 6% HybraneH/S 80 1700 | Monet Y with Hybrane H/S 80 1700 | 3.39 | 35.10 | 6.87 | 11.16 |

TABLE 1-continued

| Ink Batch # | Batch Description | Purpose | Visc | S.T. | pH | Cond |
|---|---|---|---|---|---|---|
| | 1700, 2% Calcium Nitrate Tetrahydrate, 1% Imidazole, 0.65% EDTA, 0.1% Dowicil, 0.05% PEO 18.5K, 57.2% DiH2O | | | | | |
| 5 | 15% Yellow Y-104 Dye (20%), 11% Butyl Carbitol, 7% Sulfolane (5% water), 2% Hybrane SL 1410, 2% Calcium Nitrate Tetrahydrate, 1% Imidazole, 0.65% EDTA, 0.1% Dowicil, 0.05% PEO 18.5K, 61.2% DI H2O | Monet Y with Hybrane SL-1410 | 2.34 | 31.40 | 6.90 | 12.50 |
| 6 | 15% Yellow Y-104 Dye (20%), 11% Butyl Carbitol, 7% Sulfolane (5% water), 2% Hybrane SC 120050, 2% Calcium Nitrate Tetrahydrate, 1% Imidazole, 0.65% EDTA, 0.1% Dowicil, 0.05% PEO 18.5K, 61.2% DI H2O | Monet Y with Hybrane SC 120050 | 2.10 | 34.70 | 6.30 | 13.80 |

The values listed in Table 2, reflect the average of curl (1=little, 2=slight edge curl, 3=moderate curl on sides, 4=partial scroll, 5=complete scroll). Table 3 shows intercolor bleed results for inks with and without hyperbranched polymer anti-curl agents. Tables 2 and 3 shows that with low amounts of curl agent, i.e., hyperbranched polymers, acceptable levels of curl control are achievable, without impact to intercolor bleed. Inks with hyperbranched polymers also achieve acceptable levels of curl control and intercolor bleed without impact to color optical density or drytime.

TABLE 2

Cool Curl Results for Monet Inks with Different Hybrane Polymers

| Ink Batch # | Day 1 | Day 3 | Day 7 | % Solids |
|---|---|---|---|---|
| Monet Yellow Control | 3.3 | 3.7 | 4 | AEA 12 |
| 1 | 1.5 | 3 | 3 | 6 |
| 2 | 1 | 3 | 3.3 | 3 |
| 3 | 2 | 3.5 | 3.5 | 6 |
| 4 | 2 | 3.5 | 3.5 | 6 |
| 5 | 2.2 | 2.5 | 3 | 2 |
| 6 | 2.2 | 2.2 | 2.3 | 1 |

TABLE 3

Intercolor Bleed Results for Monet Inks with Different Hybrane Polymers

| Ink Batch # | CA-12 | CJ-1 | CJ-3 | CJ-12 | Average |
|---|---|---|---|---|---|
| Monet Yellow Control | 22.65 | 38.25 | 29.55 | 61.5 | 38.0 |
| Monet with 1 wt % SC 120050 | 5.125 | 22.38 | 26.5 | 19.23 | 18.3 |
| Monet with 2 wt % SL 1410 | 4.4 | 21.8 | 25.53 | 23.18 | 18.7 |

Described herein is an ink jet ink composition comprising a hyperbranched polymer that acts as an anti-curl agent, and a printing process employing such an ink composition. The ink compositions described herein having a hyperbranched polymer as an anti-curl agent exhibit acceptable levels of curl control without impact to intercolor bleed, color optical density, water fastness, or dry time. Further, hyperbranched polymers may be used as anti-curl agents in concentrations significantly lower than conventional anti-curl agents. Thus, the ink compositions using hyperbranched polymers as an anti-curl agent do not exhibit significant increases in viscosity as compared to inks employing conventional anti-curl agents, and printing processes employing ink compositions with hyperbranched anti-curl agents therefore do not exhibit problems associated with increased viscosity to the ink composition during printing.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. An ink jet composition comprising:
    water;
    a dye;
    a sulfone humectant selected from the group consisting of dimethylsulfone, methylethylsulfone, diethylsulfone, ethylpropylsulfone, dipropylsulfone, propylbutylsulfone, dibutylsulfone, methylphenylsulfone, sulfolane, methylsulfolane, and dimethylsulfolane;
    a hydroxyether penetrant;
    calcium nitrate tetrahydrate and imidazole; and
    a hyperbranched polyesteramide having one or more carboxylic acid end groups;
    wherein the hyperbranched polyesteramide is present in an amount of from 1.0 to 2.0 weight percent of the ink composition; and
    wherein the dye is present in an amount of 15 weight percent of the ink composition.

2. An ink jet composition according to claim 1, wherein the hyperbranched polymer is water dispersible.

3. An ink jet printing process comprising applying an ink jet ink composition according to claim 1, onto a substrate with an ink jet printhead in any desired pattern in a single pass or a multiple pass method according to digital signals.

4. A method for controlling curl in an ink jet printing process, the method comprising:
    applying at least one ink jet ink composition in an imagewise fashion to a substrate, wherein said ink jet ink composition comprises a hyperbranched polyesteramide having one or more carboxylic acid end groups which is present in an amount of from 1.0 to 2.0 weight percent of the ink composition, a sulfone humectant without a hydroxyl group, a hydroxyether penetrant, calcium nitrate tetrahydrate, imidazole, and a dye which is present in an amount of 15 weight percent of the ink composition.

5. An ink jet composition comprising:

water;

a dye;

a sulfone humectant without a hydroxyl group;

a hydroxyether penetrant;

calcium nitrate tetrahydrate and imidazole; and a hyperbranched polyesteramide having one or more carboxylic acid end groups;

wherein the hyperbranched polyesteramide is present in an amount of from 1.0 to 2.0 weight percent of the ink composition; and wherein the dye is present in an amount of 15 weight percent of the ink composition.

* * * * *